US008358808B2

(12) United States Patent
Malinovskiy et al.

(10) Patent No.: US 8,358,808 B2
(45) Date of Patent: Jan. 22, 2013

(54) VIDEO-BASED VEHICLE DETECTION AND TRACKING USING SPATIO-TEMPORAL MAPS

(75) Inventors: Yegor Malinovskiy, Shoreline, WA (US); Yinhai Wang, Seattle, WA (US); Yao-Jan Wu, Charlottesville, VA (US)

(73) Assignee: University of Washington, Seattle, WA (US)

( * ) Notice: Subject to any disclaimer, the term of this patent is extended or adjusted under 35 U.S.C. 154(b) by 200 days.

(21) Appl. No.: 12/987,854

(22) Filed: Jan. 10, 2011

(65) Prior Publication Data

US 2011/0170744 A1 Jul. 14, 2011

Related U.S. Application Data

(60) Provisional application No. 61/293,285, filed on Jan. 8, 2010.

(51) Int. Cl.
*G06K 9/00* (2006.01)
*G08G 1/16* (2006.01)

(52) U.S. Cl. .......................... 382/103; 382/291; 340/903

(58) Field of Classification Search .................. 382/100, 382/103–107, 155, 162, 168, 173, 181, 184–194, 382/209, 232, 254, 274, 276, 285–291, 305, 382/312; 348/155; 340/903, 933; 701/301
See application file for complete search history.

(56) References Cited

U.S. PATENT DOCUMENTS

| 7,460,691 | B2 * | 12/2008 | Ng et al. ........................ 382/107 |
| 8,170,278 | B2 * | 5/2012 | Zhao et al. ..................... 382/103 |
| 8,179,282 | B1 * | 5/2012 | MacCarley .................... 340/933 |
| 8,195,387 | B2 * | 6/2012 | Moritz et al. .................. 701/301 |
| 8,258,980 | B2 * | 9/2012 | Becker .......................... 340/903 |
| 2005/0073585 | A1 * | 4/2005 | Ettinger et al. ............... 348/155 |
| 2005/0286738 | A1 | 12/2005 | Sigal et al. |
| 2010/0034423 | A1 | 2/2010 | Zhao et al. |

OTHER PUBLICATIONS

Gupte, S. et al., "Detection and Classification of Vehicles," IEEE Transactions on Intelligent Transportation Systems, vol. 3, No. 1, Mar. 2002, pp. 37-47.
Zhang, G. et al., "Video-Based Vehicle Detection and Classification System for Real-Time Traffic Data Collection Using Uncalibrated Video Cameras," Transportation Research Record: Journal of the Transportation Research Board, No. 1993, National Research Council, Washington, D.C., 2007, pp. 138-147.
Sun, Z. et al., "On-Road Vehicle Detection Using Optical Sensors: A Review," Proc. of the IEEE Intelligent Transportation Systems Conference, 2004, pp. 585-590.
Pang, C. et al., "A Method for Vehicle Count in the Presence of Multiple-Vehicle Occlusions in Traffic Images," IEEE Transactions on Intelligent Transportation Systems, vol. 8, No. 3, Sep. 2007, pp. 441-459.

(Continued)

*Primary Examiner* — Seyed Azarian
(74) *Attorney, Agent, or Firm* — Perkins Coie LLP (57) ABSTRACT

Systems and methods for detecting and tracking objects, such as motor vehicles, within video data. The systems and method analyze video data, for example, to count objects, determine object speeds, and track the path of objects without relying on the detection and identification of background data within the captured video data. The detection system uses one or more scan lines to generate a spatio-temporal map. A spatio-temporal map is a time progression of a slice of video data representing a history of pixel data corresponding to a scan line. The detection system detects objects in the video data based on intersections of lines within the spatio-temporal map. Once the detection system has detected an object, the detection system may record the detection for counting purposes, display an indication of the object in association with the video data, determine the speed of the object, etc.

24 Claims, 9 Drawing Sheets

OTHER PUBLICATIONS

Koller, D. et al., "Model-Based Object Tracking in Monocular Image Sequences of Road Traffic Scenes," International Journal of Computer Vision, vol. 10, Issue 3, 1993, pp. 257-281.

Tomasi, C. et al., "Detection and Tracking of Point Features," Carnegie Mellon University Technical Report CMU-CS-91-132, Apr. 1991, 38 pages.

Niyogi, S. A. et al., "Analyzing and Recognizing Walking Figures in XYT," Proc. of the IEEE Conference on Computer Vision and Pattern Recognition, 1994, pp. 469-474.

Liu, A. et al., "Video Vehicle Detection Algorithm through Spatio-Temporal Slices Processing," Proceedings of the 2nd IEEE/ASME International Conference on Mechatronic and Embedded Systems and Applications, 2006, pp. 1-5.

* cited by examiner

FIG. 9

VIDEO-BASED VEHICLE DETECTION AND TRACKING USING SPATIO-TEMPORAL MAPS

CROSS-REFERENCE TO RELATED APPLICATIONS

This application claims priority to pending U.S. Provisional Application No. 61/293,285, entitled "VIDEO-BASED VEHICLE DETECTION AND TRACKING USING SPATIO-TEMPORAL MAPS," filed Jan. 8, 2010, which is hereby incorporated by reference in its entirety.

STATEMENT REGARDING FEDERALLY SPONSORED RESEARCH OR DEVELOPMENT

This invention was made with government support under grant number DTRT07-G-0010 awarded by U.S. Department of Transportation. The government has certain rights in the invention.

BACKGROUND

Automated vehicle detection has been an important component of roadway and intersection operation systems for decades. Inductance loop detectors, which detect vehicles based on changes to the inductance within an inductance loop installed under a roadway caused by the vehicles as they pass over the loop, have been used since the early 1960s. Inductance loop detectors are relatively cheap in unit cost when compared with other detector types and can produce reliable traffic counts under many flow scenarios. Maintenance and installation of loop detectors, however, require lane closures that may generate significant indirect costs. Furthermore, inductance loop detectors are point detectors and only detect the presence of a vehicle in a relatively small space. Accordingly, multiple loop detectors are required to obtain traffic parameters other than the presence of a vehicle, such as speed and queue lengths. Moreover, embedding inductance loops in pavement causes damage to the pavement structure, thereby shortening pavement lifetime and increasing indirect costs.

In addition to inductance loop detectors, computer-vision approaches have been implemented to detect vehicles. Video cameras often have lower maintenance costs when compared to inductance loop detectors and are capable of providing richer traffic information than their inductance loop counterparts. However, since video-based vehicle detection algorithms are based on visual data, environmental factors and occlusions play significant roles in vehicle detection accuracy. Good visibility of objects of interest is a key assumption in video-based detection mechanisms. Environmental impacts, such as shadows, sun glare, lighting changes, and sight-disturbing conditions (e.g., heavy rain or snow), may degrade the visibility or alter the appearance of the objects in a scene. Additionally, vibration caused by, for example, wind or passing vehicles, is a common problem for mounted video cameras. The resulting movements of camera vibration often cause displacements of static objects between a current frame and a background frame and trigger a significant amount of false alarms in vehicle detection systems that rely on the ability to identify a static background within the video data. Additionally, vehicle occlusions resulting when one vehicle appears next to another and partially or completely obscures that vehicle are prevalent in most observation angles and can be difficult to overcome in computer-vision based approaches to vehicle detection.

DETAILED DESCRIPTION

Systems and methods for detecting and tracking objects, such as motor vehicles, within video data are disclosed herein. In some embodiments, the detection system analyzes video data showing objects as the objects pass within the view of a video capture device (e.g., surveillance camera, portable video camera, security camera) to produce object trajectories. The video data may be provided, for example, by a surveillance camera mounted in proximity to a roadway (e.g., freeway, highway, arterial road) and show motor vehicles as they travel along the roadway. The detection system may analyze the video data to count the number of detected objects, determine speeds of the detected objects, determine distances between the objects, determine the general flow of the objects over time, determine traffic density, track the path of detected objects, determine the direction of object travel, and so on without relying on the detection and identification of background data within the captured video data.

In some embodiments, a detection zone is manually or automatically defined within the video data. For example, a user may first identify a "detection zone" within the video data. The detection zone corresponds to an area of the video data where the user is interested in detecting objects. For example, a user who wishes to detect vehicles traveling in two different lanes of traffic may use an input device (e.g., mouse) to draw a box around both lanes such that the sides of the box are approximately parallel to the travel path of the objects and the top and bottom of the box are approximately perpendicular to the travel path of the objects. To reduce distortion caused by the perspective effect, the detection system uses the detection zone specified by the user to generate a transformation matrix, such as a homography matrix, that can be used to transform the video data to simulate a top-down view of the detection zone. The detection system then applies the transformation matrix to the area of the video data corresponding to the detection zone and displays the transformed video data.

Figure 5:
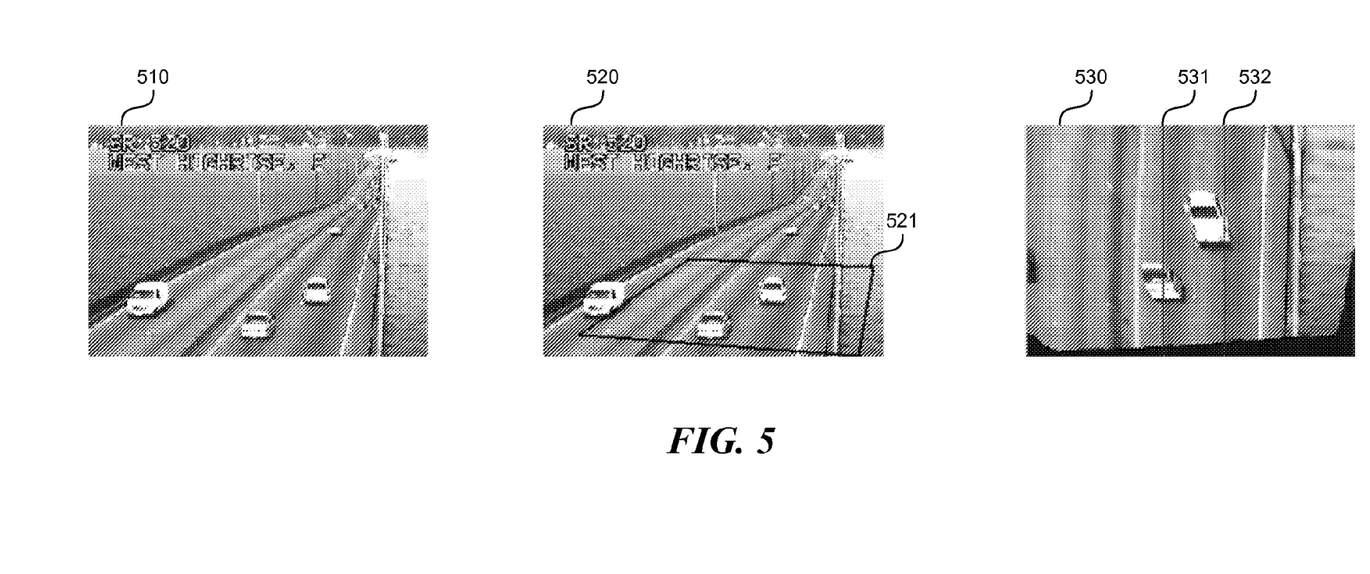
FIG. 5 is a display page showing one frame of captured video data, the same frame of captured video data with a marked detection zone, and the portion of the frame corresponding to the detection zone after a transformation has been applied.

By way of example, FIG. 5 illustrates sample video data frame 510, detection zone 521, and the display of transformed video data 530 corresponding to detection zone 521.

Figure 3:
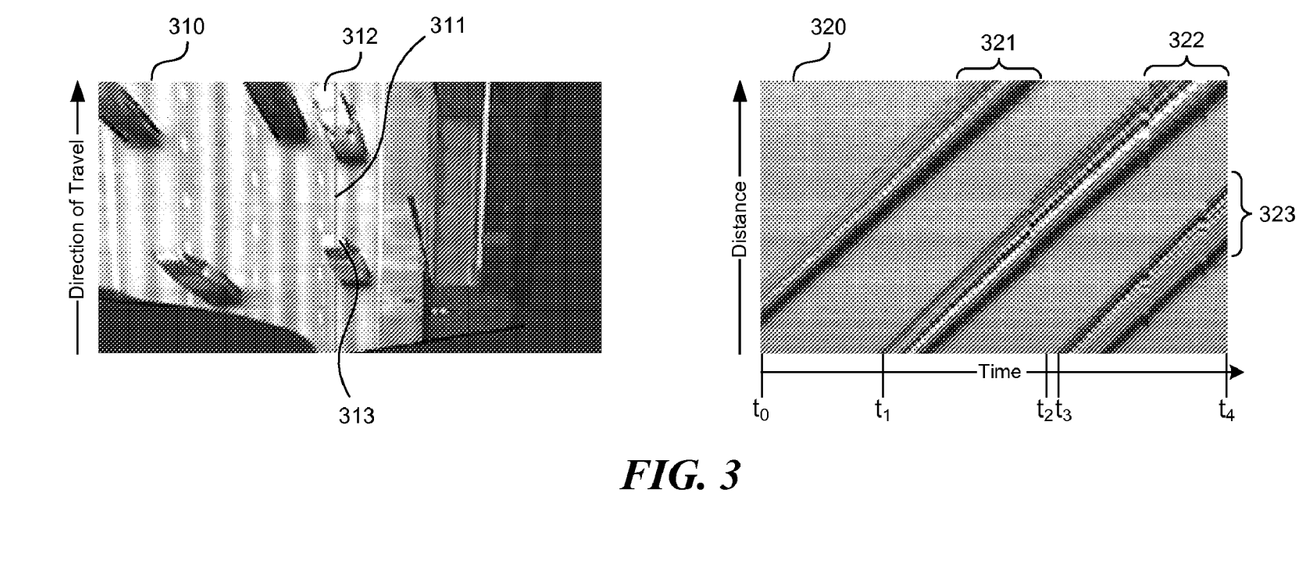
FIG. 3 is a display page showing one frame of captured video data and a spatio-temporal map associated with the captured video data in some embodiments.

In some embodiments, a scan line is manually or automatically defined within the video data. For example, once video data is displayed, a user may specify one or more scan lines by, for example, drawing the scan line(s) on the transformed video data. The detection system uses each scan line to generate a spatio-temporal map. A spatio-temporal map is a time progression of a slice of video data representing a history of pixel data (e.g., Red, Green, Blue intensity values or Hue, Saturation, and Luminance values) corresponding to a particular scan line (i.e., the pixels covered by the scan line). As the detection system processes video frames, the pixels corresponding to a particular scan line are added to a spatio-temporal map along the time axis. By way of example, FIG. 3 illustrates sample transformed video data frame 310, a scan line 311, and a spatio-temporal map 320 representing pixel data captured from multiple video data frames, such as video data frame 310. In this example, as pixel data is captured from each video frame, the detection system adds the captured pixel data to the right side of the spatio-temporal map 320. In other words, the rightmost column of pixels in the spatio-temporal map represents the most recently captured pixels (i.e., those from the most recently processed video frame), the column of pixels immediately to the left of that column represent the second most recently captured pixels (i.e., those from the second most recently processed video frame), and so on. As an object passes through the scan line, the old pixel data moves from right to left along the temporal axis and pixel data for the object will tend to move upwards along the spatial axis, consistent with the object's direction of travel. In some embodiments, the spatio-temporal map may have a different orientation. For example, the detection system could be configured to add captured pixel data to the left side of a corresponding spatio-temporal map. Additionally, pixel data for objects moving towards the video capture device will move downwards relative to previously captured pixel data. In some embodiments, the user may draw scan line(s) on the non-transformed video data which can be converted using the transformation matrix.

In some embodiments, the detection system detects objects in the video data based on intersections of lines detected within the spatio-temporal map. To detect lines within a spatio-temporal map, the detection system may apply an edge detection technique (e.g., the Canny edge detection algorithm, the Sobel operator, or the Robert's Cross operator) in combination with a feature extraction technique (e.g., the Hough line transform) to the spatio-temporal map. Each detected line is referred to as a "strand line." As discussed in further detail below, a "strand" is a group of strand lines that are presumed to correspond to one object. By way of example, FIG. 3 illustrates strands 321, 322, and 323. Conceptually, a strand represents a portion of an object as that portion passes through the scan line associated with the spatio-temporal map. For example, a white vehicle with a black bumper passing through a one-pixel wide scan line may be represented in a spatio-temporal map at least in part by a white region of a strand corresponding to the top of the vehicle, another white region of the strand corresponding to the trunk of the vehicle, and a black region of the strand corresponding to the bumper of the vehicle. Additional features of the car, such as the hood, rear window, license plate, etc. may also be represented in the spatio-temporal map if they are visible and if they pass through the scan line. "Jitter" in strand lines might be observed due to, for example, movement of the object orthogonal to the scan line, shaking of the camera, etc. Detection of strands and strand lines is discussed in further detail below with reference to FIGS. 6-9. Once the detection system has detected a strand corresponding to an object, the detection system may, for example, record the detection for counting purposes, highlight the detected object on, or in association with, the video data by mapping pixels in the spatio-temporal map to the video data, determine the speed of the object, etc.

Figure 1:
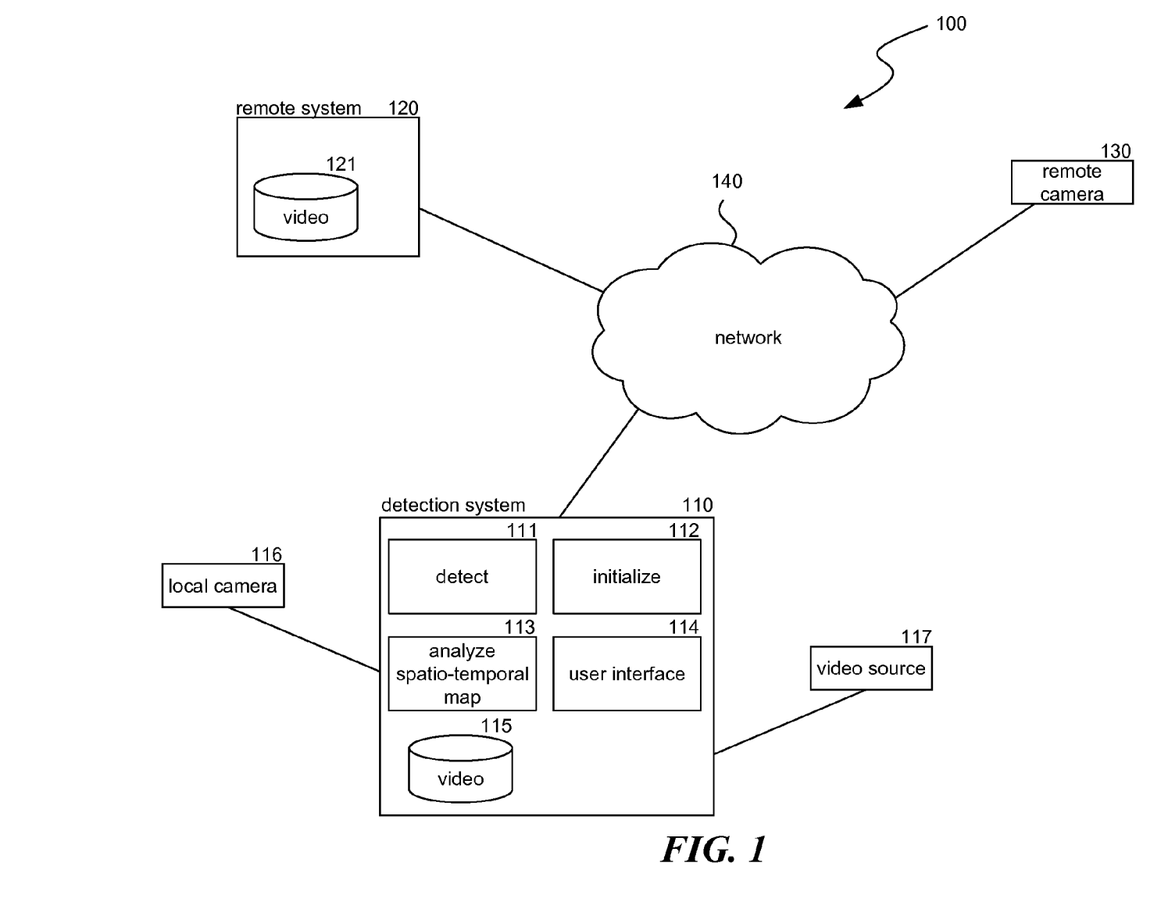
FIG. 1 is a block diagram illustrating an environment 100 in which the detection system may operate in some embodiments.

FIG. 1 is a block diagram illustrating an environment 100 in which the detection system may operate in some embodiments. In this example, the environment includes detection system 110, remote system 120, local camera 116, video source 117, remote camera 130, and network 140. Detection system 110 comprises components for detecting and tracking objects within video data including detect component 111, initialize component 112, analyze spatio-temporal map component 113, and user interface component 114. Detection system 110 also includes video store 115 and is coupled to local camera 116, each of which are capable of providing video data to the detection system for processing and analysis. Video source 117 provides video data to the detection system and may include, for example, a digital video disk (DVD) player, a video cassette recorder, a portable electronic device, a handheld camera, a cellular telephone, etc. Detect component 111 processes video data to detect and track objects therein based on spatio-temporal maps. Initialize component 112 initializes the detection system for processing of video data based on user input, such as the specification of a detection zone and scan lines. Analyze spatio-temporal map component 113 detects and analyzes strand lines and strands within spatio-temporal maps to determine information about objects in the video data, such as their position, speed, etc. User interface component 114 provides an interface through which a user may interact with the detection system. For example, the user interface may display an indication of objects detected within video data, receive user input specifying a detection zone, etc. Video store 115 stores video data, such as video data received over network 140 and/or video data captured via a camera coupled to the detection system, such as local camera 116. Alternatively, the detection system may process data received directly from a camera, such as local camera 116. Remote system 120 hosts video store 121, which stores video data that may be accessible to the detection system via network 140. Remote camera 130 captures video data that may be accessible to the detection system via network 140 by way of, for example, a live video feed or stream. The video data processed by the detection system may include video data captured by a live camera feed or may include archived or previously captured video data, such as video data from a previous day, week, month, year, etc.

The detection system may be implemented on a single computing device or in a distributed environment in which functions or modules are shared among disparate computing devices. The computing devices on which the detection system is implemented may include a central processing unit, memory, input devices (e.g., keyboard and pointing devices), output devices (e.g., display devices), and storage devices (e.g., disk drives). The memory and storage devices are computer-readable media that may be encoded with computer-executable instructions that implement the detection system, which means a computer-readable medium that contains the instructions. Such computer-readable media may include magnetically or optically readable computer discs, hard-wired or preprogrammed chips (e.g., EEPROM semiconductor chips), nanotechnology memory, or other data storage media. Alternatively, instructions, data structures, and message structures related to the detection system may be transmitted over the Internet or over other networks (including wireless networks) via a propagated signal on a propagation medium (e.g., electromagnetic wave(s), sound wave(s), etc.). Various communication links may be used for transmission, such as the Internet, a local area network, a wide area network, a point-to-point dial-up connection, a cell phone network, and so on. In addition, stored or transmitted data may be encrypted.

Embodiments of the detection system may be implemented in and used with various operating environments that include personal computers, server computers, handheld or laptop devices, multiprocessor systems, microprocessor-based systems, virtualized computers, programmable consumer electronics, digital cameras, network PCs, minicomputers, mainframe computers, computing environments that include any of the above systems or devices, and so on.

The detection system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
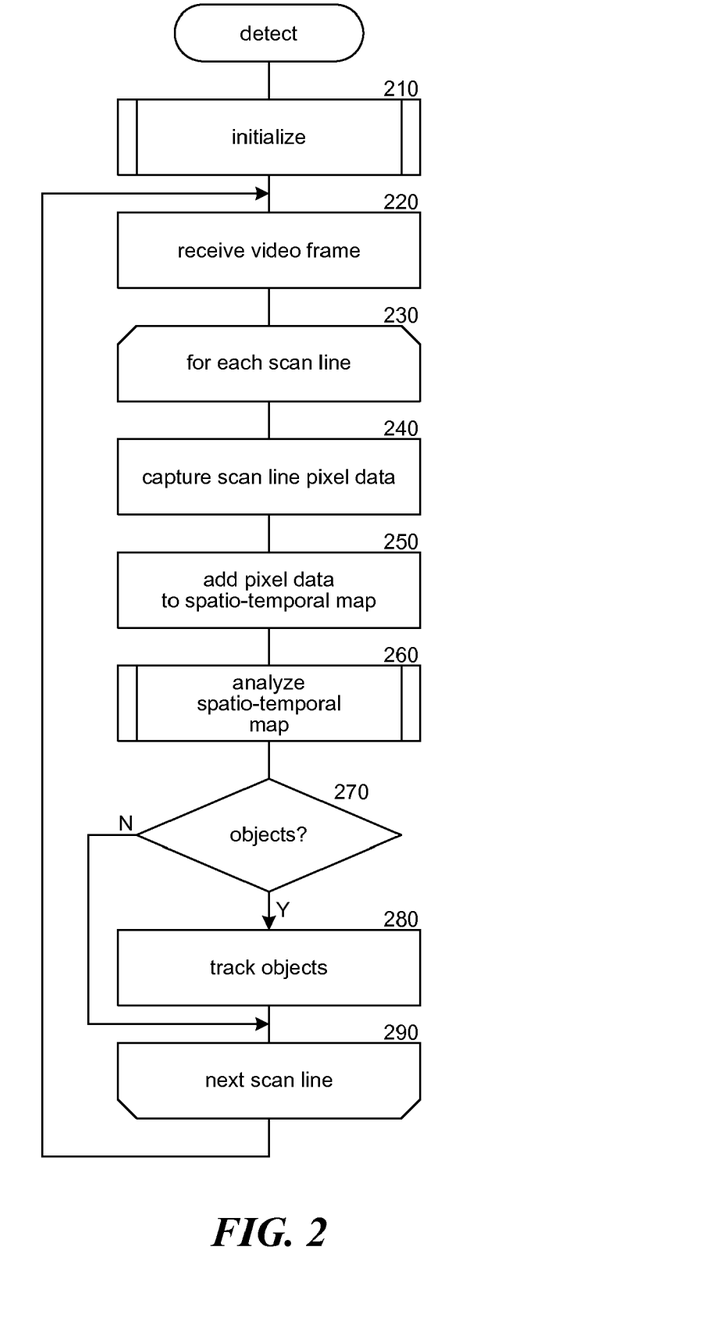
FIG. 2 is a block diagram illustrating the processing of a detect component in some embodiments.

FIG. 2 is a block diagram illustrating the processing of a detect component in some embodiments. In block 210, the component invokes an initialize component, discussed in further detail below with respect to FIG. 4, to allow a user to specify a detection zone and one or more scan lines and to generate a matrix for transforming video data. In block 220, the component receives a video frame, such as a video frame stored in a data store or a data frame received directly from a video camera or other video sources or media players. In blocks 230-290, the component selects each scan line and determines whether objects have intersected the scan line by analyzing associated spatio-temporal maps. In block 240, the component captures, from the received video frame, pixel data that corresponds to the currently selected scan line.

In block 250, the component adds the captured pixel data to the spatio-temporal map associated with the currently selected scan line. In some examples, the spatio-temporal map for a particular scan line is stored in a two-dimensional buffer having a height based on, for example, the length of the scan line and a width, each location in the buffer storing corresponding pixel data captured from the video data. The width of the buffer may be fixed or may change over time. In some embodiments, the width of the buffer may be based on a known average speed of objects to be detected or the estimated speed of those objects. In some embodiments, the width may be based on the known or estimated speed of slow moving objects within the video data to ensure that the spatio-temporal map is sufficiently wide to contain pixel data from enough frames to analyze the trajectory of slower objects. Alternatively, the detection system may automatically resize the buffer to account for changes in object speed. For example, a detection system that captures vehicles traveling along a busy freeway may widen the buffer at rush hour, when vehicles are traveling slower, to increase the number of frames represented in the spatio-temporal map and narrow the buffer at off-peak times, when vehicles are traveling faster, to reduce processing requirements. The width of the spatio-temporal map represents the amount of time that is or can be represented in the spatio-temporal map. Each time the component captures scan line pixel data (e.g., for every frame of the analyzed video data, every other frame, every fifth frame) the component may add the captured pixel to one side of the buffer (e.g., the right side). Furthermore, the component may shift the older pixel data in the spatio-temporal map in one direction (e.g, to the left) to accommodate for the newly captured pixel data. When the buffer becomes full, the component may discard the oldest pixel data represented in the spatio-temporal map as it shifted out of the map or may write the oldest pixel data to another location, such as a disk or another buffer.

FIG. 3 is a display page showing one frame 310 of captured video data and the spatio-temporal map 320 associated with the captured video data in some embodiments. As discussed above, a spatio-temporal map represents a history of pixel data corresponding to a particular scan line. In this example, the captured video data represents vehicles, such as vehicles 312 and 313, traveling along a roadway. Spatio-temporal map 320 includes pixel data corresponding to scan line 311 captured between time $t_0$ and time $t_4$, each point along the time axis corresponding to a different frame of the video data. Spatio-temporal map 320 has been created by capturing, for each of a plurality of frames, the pixel data corresponding to scan line 311 (i.e., the pixels covered by the scan line). Although widened in this case for visibility, scan line 311 represents a one-pixel wide scan line representative of a portion of one lane of vehicle travel (the rightmost lane in video frame 310). Thus, each one-pixel wide column in spatio-temporal map 320 represents data captured from one frame of video data; the column of pixels at time $t_0$ corresponds to the earliest pixel data represented in spatio-temporal map 320 while the column of pixels at time $t_4$ corresponds to the most recently captured pixel data. In this example, scan line 311 spans the entire height of the detection zone represented in the video frame 310. In some examples, a scan line may span only a portion of the height or width of a video frame or detection zone.

Spatio-temporal map 320 shows that between time $t_0$ and time $t_4$, three vehicles passed through or intersected scan line 311: the first vehicle corresponding to strand 321, the second vehicle corresponding to strand 322, and the third vehicle corresponding to strand 323. In this example, pixel data at the top of spatio-temporal map 320 represents data that is further away from the capture device than pixel data at the bottom of the spatio-temporal map. Furthermore, pixel data on the left side of spatio-temporal map 320 represents older data than pixel data on the right side of the spatio-temporal map. As each vehicle traveled or travels along the scan line, the pixel data representing the vehicle moves upwards in the spatio-temporal map. From the spatio-temporal map, one can determine that the first vehicle (V1) first intersected scan line 311 prior to time $t_0$ and exited the scan line at approximately time $t_2$. Similarly, the second vehicle (V2) first intersected scan line 311 at approximately time $t_1$ and will exit the scan line sometime after time $t_4$. As another example, the third vehicle (V3) first intersected scan line 311 at approximately time $t_3$ and will exit the scan line sometime after time $t_4$. Accordingly, between time $t_0$ and time $t_1$ pixel data associated with only one vehicle, V1, intersected scan line 311 while between time $t_1$ and time $t_2$ pixel data associated with two vehicles, V1 and V2, intersected scan line 311. In this example, the strand lines are relatively straight, indicating that the speed and direction of the vehicles remained relatively constant while the vehicles passed through the scan line. In situations where the strand lines curve due to, for example, changes in object speed or direction, the detection system may use a curve detection algorithm instead of detecting lines in the spatio-temporal map. Furthermore, curves may be eliminated or reduced by redrawing the detection zone and/or scan line.

Techniques for identifying strands and strand lines are discussed in further detail below with reference to FIGS. 6-9.

Figure 4:
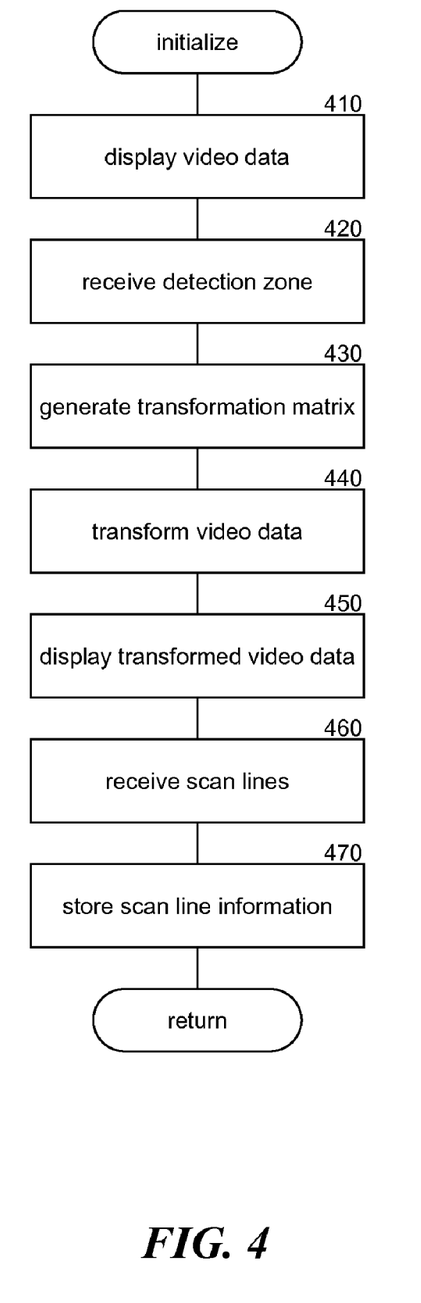
FIG. 4 is a block diagram illustrating the processing of an initialize component in some embodiments.

Returning to FIG. 2, in block 260, the detect component invokes an analyze spatio-temporal map component to detect strand lines and strands within the spatio-temporal map and their associated objects. The analyze spatio-temporal map component returns an indication of any detected objects, such as their position at a particular time or times, their velocity, etc. In decision block 270, if the analyze spatio-temporal map component detected any objects, then the component continues at block 280, else the component continues at block 290 to select the next scan line. In block 280, the component tracks the detected objects by, for example, displaying a marker in association with the video data to highlight the detected object, incrementing an object counter, etc. In some examples, the component may only indicate that an object has been detected (e.g, by counting or tracking) if the object has been detected in at least a predetermined number of frames (e.g., the last 20 frames) or if they have been detected within the video data over a predetermined time period (e.g., 5 seconds). Furthermore, the component may apply a noise filter, such as the Kalman filter, to reduce the likelihood of inaccuracies in object detection. When multiple scan lines are associated with a particular path of object travel, the component may only indicate the detection of an object if data for two or more of the multiple scan lines indicates the presence of an object. In block 290, the component selects the next scan line. Once each scan line has been selected, the component loops back to block 220 to process another video frame. In this manner, the detection system can identify and track objects in video data without relying on the detection and identification of background data within the video data FIG. 4 is a block diagram illustrating the processing of an initialize component in some embodiments. In block 410, the component displays the video data to be processed. The component may receive an indication of the video data, such as a location or address, from a user and display the video data via a user interface associated with the detection system. As discussed above, the video data may include objects passing in front of a capture device (e.g., video camera), such as motor vehicles, bicycles, pedestrians, animals, items traveling along an assembly line, and so on. In block 420, the component receives an indication of a detection zone. For example, the user may draw a box around an area of interest, such as a box that at least approximates a rectangle in the real world represented in the video data. FIG. 5 shows captured video frame 520 with marked detection zone 521. In this example, the detection zone has been drawn so that the left and right sides are approximately parallel to the path of travel of the vehicles to be detected and the top and bottom of the detection zone are approximately perpendicular to the path of travel of the vehicles. Detection zone 521 spans three paths of travel (e.g., lanes), two of which include vehicles traveling in one direction and one that includes vehicles traveling in the opposite direction. A detection zone may be drawn to cover any number of paths of travel.

In some embodiments, the detection system may define the detection zone automatically. Using a feature extraction technique, such as Lucas-Kanade-Tomasi feature tracking, the detection system may ascertain paths of objects moving within video data over a period of time (e.g., 30 seconds) or a predetermined number of video frames (e.g., 1000 frames). The detection system may assume that the "dominant path" (i.e., the path with the most movement in one or both directions) corresponds to the direction or directions of travel for the objects to be detected and use the dominant path to specify two sides of the detection zone. For example, the detection system may establish left and right sides of the detection zone that have slopes equal or approximate to the slope of the dominant path. Furthermore, the relative width of the detection zone can be determined based on the areas in which the detection system detected movement along the dominant path. For example, an area where objects are moving downwards in the video data along the dominant path may serve as a basis for establishing the leftmost edge of the detection zone while an area where objects are moving upwards in the video data along the dominant path may serve as a basis for establishing the rightmost edge of the detection zone. The top and bottom of the detection zone may be determined based on a position relative to the video data, such as the bottom edge of the video data, the center, the top, a line of horizon identifiable within the video data, and so on. Alternatively, the top and bottom of the detection zone may be based on the dominant path, such as points where detected movement along the dominant path ends (or begins) (e.g., at or near a point where objects leave the frame or at or near a point where the path of movement changes).

In block 430, the component generates a transformation matrix based on the detection zone. The transformation matrix is used to transform the existing view angle of the video data to an overhead view of a specified detection zone. In some embodiments, the component generates the transformation matrix by mapping the coordinates of each corner of the detection zone to an imaginary rectangle and solving for the transformation matrix that translates the points in the video data to the points on the imaginary rectangle. Using detection zone 521 as example, the component may first determine the coordinates of each corner of the detection zone. For example, the bottom left corner of detection zone 521 may be located at (60, 25, 1), the top left corner at (230, 165, 1), the top right corner at (600, 150, 1), and the bottom right corner at (520, 0, 1). Next, the component maps the coordinates of each point to a corresponding point on an imaginary rectangle. In this example, (60, 25, 1) can be mapped to (0, 0, 1) on the imaginary rectangle, (230, 165, 1) can be mapped to (0, 100, 1), (600, 150, 1) can be mapped to (100, 100, 1), and (520, 0, 1) can be mapped to (100, 0, 1). If a point $p_v$ in the video data can be represented as $$p_v = \begin{bmatrix} x_v \\ y_v \\ 1 \end{bmatrix},$$

then its corresponding matching point $p_r$ on the imaginary rectangle can be represented as $$p_r = \begin{bmatrix} x_r \\ y_r \\ 1 \end{bmatrix}.$$

Using the four pairs of corresponding points discussed above, the transformation matrix, $H_{vr}$ can be determined or estimated using known linear or non-linear transformation techniques, such as by invoking the getPerspectiveTransform function of the OpenCV library presently maintained by Willow Garage. Transformation matrix $H_{vr}$ can be used to transform coordinates relative to the video data to coordinates relative to imaginary rectangle according to the equation $p_r = H_{vr} * p_v$. Furthermore, the inverse or reciprocal matrix of $H_{vr}$, $H_{rv}$, can be used to transform points in the imaginary rectangle space to the video space. In some embodiments, the size of the imaginary rectangle may be based on the distance between corners of the detection zone.

In block 440, the component applies the transformation matrix to frames of the video data to transform the video data to a top down view. In some examples, the component may apply the transformation matrix to an entire frame or a portion of the frame, such as the portion of the frame corresponding to the detection zone. In block 450, the component displays the transformed video data. FIG. 5 includes a transformed version 530 of detection zone 521 generated by applying a transformation matrix to video data within the detection zone. When the perspective transformation is performed using this approach, image points on the ground have accurate transformations while points above the ground plane are distorted; the height distortion of an object increases as the distance between the object and the camera increases.

In block 460, the component receives one or more scan lines. For example, a user may draw the scan lines on the video data or the transformed video data. By way of example, FIG. 5 shows scan lines 531 and 532 in display frame 530, each scan line corresponding to a different path of travel represented in the transformed video data. Each scan line is used to generate a spatio-temporal map using pixel data captured from video frames. In some examples, the user may draw multiple scan lines on a path of travel to increase the probability of detecting an object, increase objection detection accuracy, or provide further analysis of object travel. For example, a narrow vehicle, such as a motorcycle, may not pass through a scan line if the scan line is located on the left side of a lane and the motorcycle is traveling on the right side of the lane. Using multiple scan lines for the lane (e.g., one on the left side, one in the middle, and one on the right side) could increase the probability of detecting the motorcycle or other objects. In this case, multiple spatio-temporal maps can be created for the lane, one spatio-temporal map for each scan line. As another example, the detection system may use multiple scan lines to detect the lateral path of an object to detect, for example, when a vehicle changes lanes. In some embodiments, the detection system may define the detection zone automatically based on ascertained paths of object travel, such as a dominant path determine as described above.

In block 470, the component stores information for each scan line and then returns. For example, the component may store locations of end points of a one-pixel wide scan line or the locations of each corner of a multi-pixel wide scan line. In some embodiments, a multi-pixel wide scan line may be treated as multiple distinct single-pixel wide scan lines, each scan line having its own associated spatio-temporal map. Furthermore, the component may prompt the user to input the real world length of each scan line (e.g., 50 feet, 100 yards, ¼ mile) and store this information, which can be used to determine the speed of detected objects, the distance between detected objects, and so on.

Figure 6:
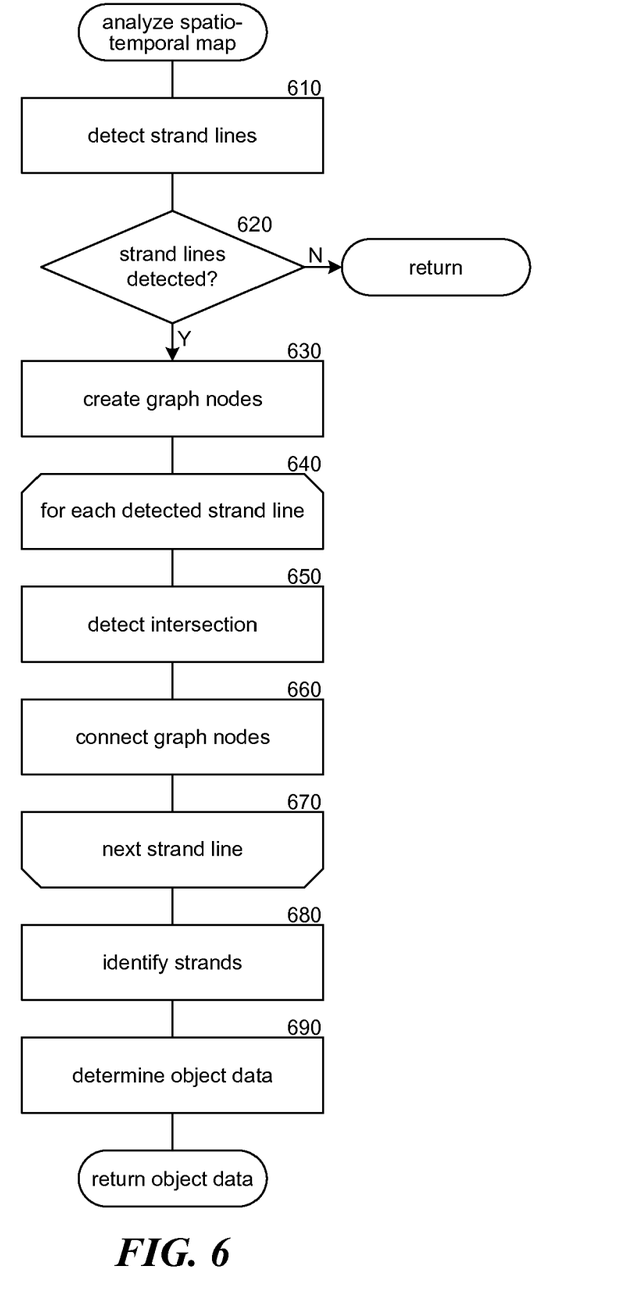
FIG. 6 is a block diagram illustrating the processing of an analyze spatio-temporal map component in some embodiments.

FIG. 6 is a block diagram illustrating the processing of an analyze spatio-temporal map component in some embodiments. The analyze spatio-temporal component detects strand lines within a spatio-temporal map and groups the strand lines into "strands" used to identify objects in the corresponding video data. In block 610, the component attempts to detect strand lines within the spatio-temporal map. A strand line is an identifiable line passing through the spatio-temporal map created by movement in the corresponding video data. To detect strand lines within a spatio-temporal map the component may, for example, apply an edge detection technique (e.g., the Canny edge detection algorithm) and a feature extraction technique (e.g., the Hough transform) to the spatio-temporal map to identify lines among the detected edges. Alternatively, other known feature detection and extraction techniques may be applied to the spatio-temporal map to detect features therein, such as lines or curves.

Figure 7:
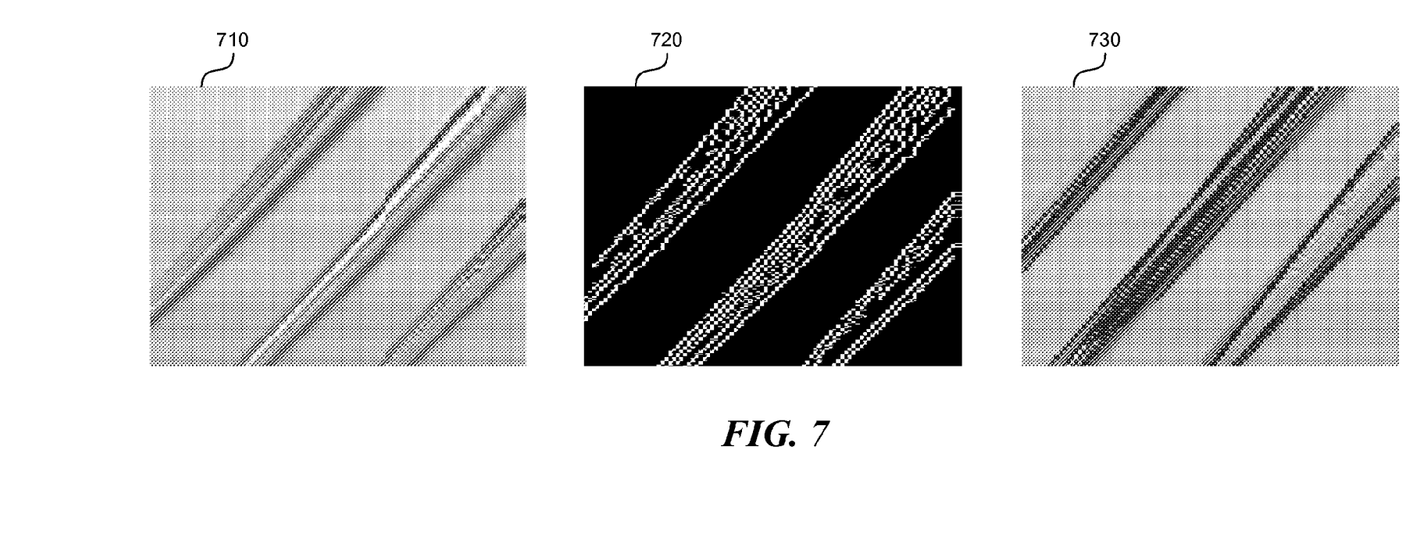
FIG. 7 is a display page showing a spatio-temporal map, a representation of edges detected within the spatio-temporal map, and a representation of strand lines detected within the spatio-temporal map in some embodiments.

FIG. 7 is a display page showing a spatio-temporal map 710, a representation 720 of edges detected within the spatio-temporal map using the Canny edge detection algorithm, and a representation 730 of strand lines detected within the spatio-temporal map using the Hough transform. One skilled in the art will understand that while only a segment of a strand line may be visible or represented in the spatio-temporal map, these segments can be extended in either direction.

Figure 8:
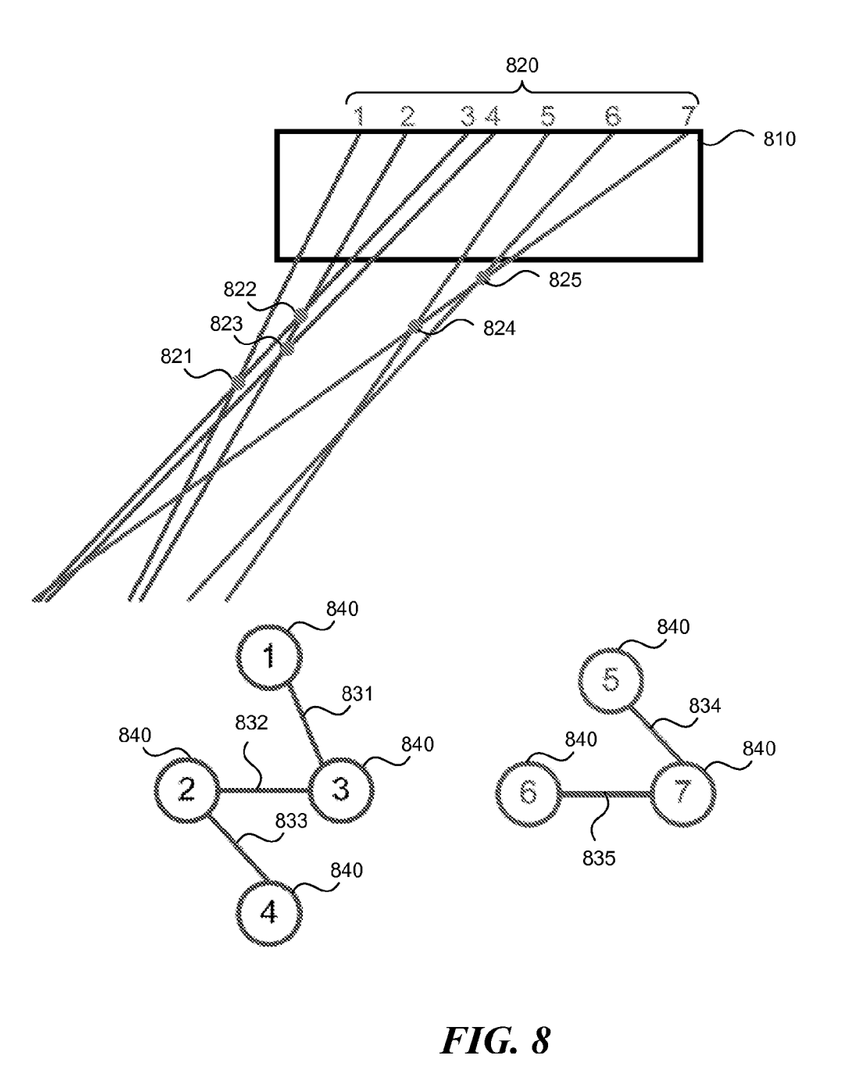
FIG. 8 is a display page illustrating strand lines detected within a spatio-temporal map in some embodiments.

FIG. 8 is a display page illustrating strand lines 820 (numbered 1-7) detected within a spatio-temporal map in some embodiments. In this example, area 810 corresponds to the spatio-temporal map. The pixel data of the spatio-temporal map have been removed to highlight the detected strand lines 820. Furthermore, for illustrative purposes, the detected strand lines 820 have been extended beyond the visible area of the spatio-temporal map.

Referring to FIGS. 6 and 8 together, in decision block 620, if strand lines were detected in block 610, then the component continues at block 630, otherwise the component returns without detecting any objects. In block 630, the component creates a graph node for each of the detected strand lines, such as graph nodes 840 (numbered 1-7, each graph node being associated with the identically numbered strand line of detected strand lines 820).

In blocks 640-670, the component loops through the detected strand lines to detect intersections between the detected strand lines and to connect the associated graph nodes based on the intersections. As discussed above, the transformation of the video data causes object distortion such that an object will appear to lengthen and get taller as the distance between the object and the camera increases. Accordingly, the strand lines associated with a particular object will theoretically converge at some point below the spatio-temporal map. However, due to inherent error and redundancy of line detection techniques, the strand lines may not converge at one point. Nevertheless, and as explained in further detail below, the intersections of strand lines can be used to group or cluster strand lines associated with an object.

In block 650, the component detects at least one intersection between the currently selected strand line and another strand line. In this example, because a strand line will intersect every other non-parallel strand line, the component detects the intersection that is closest to the spatio-temporal map (the first intersection encountered when traversing the currently selected strand line from the top of the spatio-temporal map downwards). For example, for strand line 1 in FIG. 8, the detected intersection is its intersection with strand line 3 at intersection point 821. Although strand line 1 also intersects with other strand lines (e.g., strand line 2), its intersection with strand line 3 is the first intersection encountered when traversing strand line 1 downwards from the spatio-temporal map. As another example, the detected intersection for strand line 2 is its intersection with strand line 3 at intersection point 822, which also corresponds to detected intersection point for strand line 3. Similarly, the detected intersections for each of strand lines 6 and 7 is at intersection point 825.

In block 660, the component connects the graph nodes corresponding to the intersection detected for the currently selected strand line. For example, the detected intersection between strand lines 1 and 3 results in the connection of graph nodes 1 and 3 via edge 831. Similarly, the detected intersection between strand lines 4 and 2 at intersection point 823 results in the connection of graph nodes 4 and 2 via edge 833. Accordingly, each of edges 831-835 corresponds to an intersection point 821-825.

In block 680, the component identifies strands based on the connected graph nodes using a connected component analysis, such as a depth-first search algorithm, to determine the connected graph nodes. In this example, the component identifies two strands—one strand corresponding to connected graph nodes 1-4 (and strand lines 1-4) connected via edges 831-833 and one strand corresponding to graph nodes 5-7 (and strand lines 5-7) connected via edges 834 and 835—each strand corresponding to a potential object. In some examples, the component may discard strands that do not include a predetermined threshold number of strand lines (e.g., at least 3 strand lines) to avoid detection of shadows or other objects that may not be of interest. Although the graph nodes and edges between the nodes are represented visually, one skilled in the art will understand that the nodes and edges need not be displayed visually. Furthermore, the graphs can be created using a software graph library, such as the BOOST C++ graph library.

Figure 9:
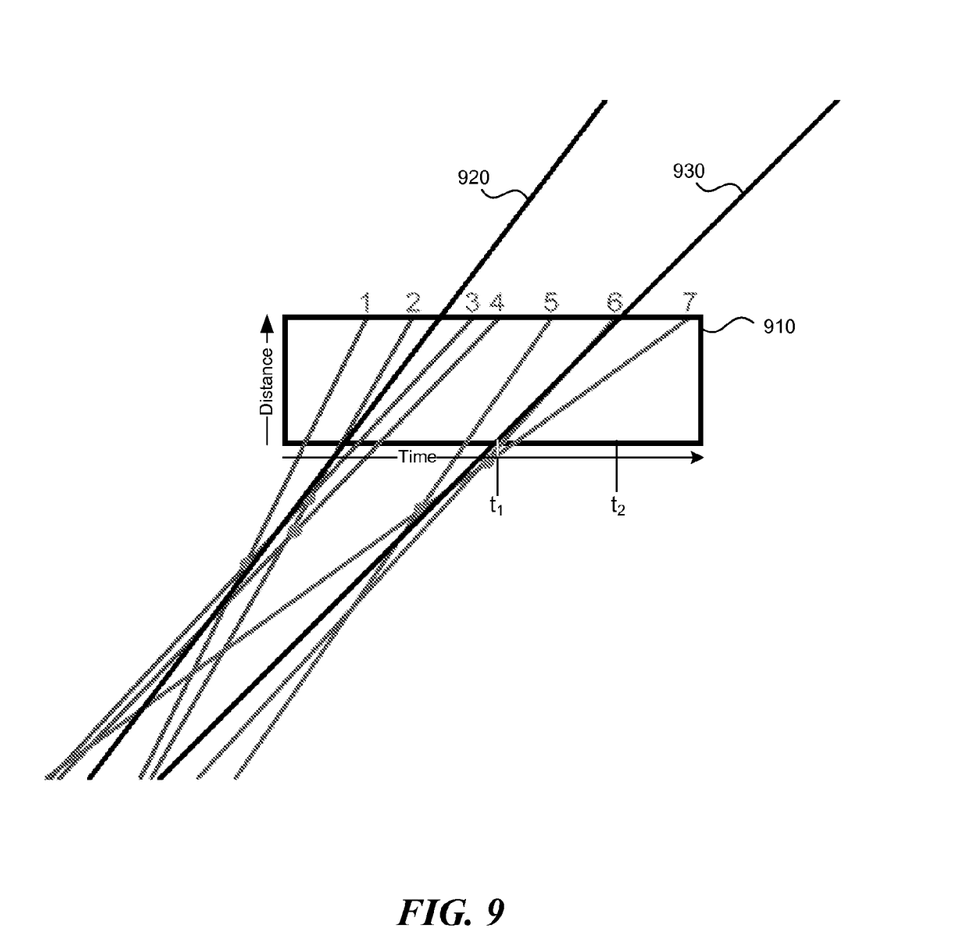
FIG. 9 is a display page illustrating average strand lines generated from the strand lines of FIG. 8 in some embodiments.

In block 690, the component determines object data based on the identified strands, such as trajectory or path of the objects corresponding to each identified strand. The trajectory of an object can be determined by, for example, generating an "average strand line" for a particular strand based on the strand lines of that strand and obtaining coordinates along the average strand line to reconstruct object trajectory. The average strand line represents an interior portion of the object intersecting the scan line as the object passes through the scan line. By way of example, FIG. 9 is a display page illustrating average strand lines 920 and 930 generated from the strand lines 820 of FIG. 8 in some embodiments. In this example, average strand line 920 represents the average path of strand lines 1-4 and average strand line 930 represents the average path of strand lines 5-7. The trajectory of an interior portion of a detected object, relative to the corresponding scan line, can be calculated by determining where the average strand line passes through the spatio-temporal map. Thus, for a given time, the position of a portion of the object can be determined based on where the average strand line passes through the spatio-temporal map at that time. For example, at time $t_1$, an interior portion of the object associated with average strand line 930 first intersects the bottom of the scan line associated with the spatio-temporal map. Similarly, at time $t_2$, the approximate center of the object associated with average strand line 930 intersects the top of the associated scan line. In cases where the speed and direction of an object remains relatively constant throughout the video data, the position of an object can be estimated even when the object is beyond the range of the scan line by extending the average strand line beyond the spatio-temporal map, as shown in FIG. 9. Alternatively, other portions of an object can be tracked using one or more of the detected strand lines. For example, the trajectory of the bottommost edge of the object associated with strand lines 5-7 in FIG. 8 may be determined based on the path of strand line 7 through the spatio-temporal map and beyond. Similarly, the trajectory of the topmost edge of the same object may be determined based of strand line 5.

Because each point along the time axis of the spatio-temporal map is associated with a video frame, the position of an object relative to the scan line and the position of the scan line relative to the video data can be used to determine the position of the object in the video frame. Once the position of the object in the video is known, an indication of the object can be displayed in association with the video, such as a dot overlaid on the vehicle to highlight the object's position, an indication of the object's speed, etc. This process can be performed for each frame of the video data in order to highlight the object as it travels. Furthermore, if the scan line was drawn on transformed video data, the position of the object in the transformed video data can be converted to the non-transformed video data using the reciprocal transformation matrix discussed above. In this manner, detected objects can be tracked or highlighted in association with the non-transformed video data so that a user may monitor objects without distortion. In some embodiments, the component may store, for each video frame, the position and/or other information about objects within that frame for further processing or to be displayed in association with the video data at a later time.

In addition to determining the trajectory of an object, the component may also extract additional data about objects from the spatio-temporal map, such as the velocity of the objects based on the slope of the strand lines, the length of objects based on the width of associated strands, the space headway between objects based on the vertical distance between strands, the time headway between objects based on the horizontal distance between strands, object density based on the overall area of the spatio-temporal map filled by strands, and so on.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Various modifications may be made without deviating from the spirit and scope of the described technology. For example, the display pages used by the system may differ from those shown in that they, for example, may be organized in a different manner, may contain more or less information than shown, may be compressed or encrypted, and may be optimized in a variety of ways. Those skilled in the art will further appreciate that the depicted flow charts may be altered in a variety of ways. For example, the order of the steps may be rearranged, steps may be performed in parallel, steps may be omitted, or other steps may be included. Accordingly, the disclosure is not limited except as by the appended claims.

We claim:

1. A method, performed by a computer having a memory and a processor, for locating objects within video data, the method comprising:
  receiving a selection of a set of pixels of the video data;
  for each of a plurality of frames of the video data,
  capturing pixel data for the selected set of pixels, and
  adding the captured pixel data to image data associated with the selected set of pixels, wherein the image data comprises a spatio-temporal map representative of the selected set of pixels over a period of time;
  with the processor, detecting strand lines within the image data associated with the selected set of pixels;
  clustering the strand lines detected within the image data associated with the selected set of pixels; and
  detecting objects based on the clustered strand lines, wherein each cluster of strand lines corresponds to a different object within the video data.

2. The method of claim 1 wherein the clustering the strand lines comprises:
  detecting intersections between the strand lines detected within the image data.

3. The method of claim 2 wherein the clustering the strand lines comprises:
creating a node for each detected strand line within the image data so that each detected strand line is associated with a node;
for each detected strand line,
identifying an intersection between the detected strand line and another detected strand line, wherein the intersection occurs within the image data or when the detected strand lines are extended beyond the image data, and
creating an edge between the node associated with the detected strand line and the node associated with the other detected strand line; and
identifying groups of connected nodes, each group corresponding to a different cluster.

4. The method of claim 1, further comprising:
after detecting an object, displaying an indication of the detected object in association with the video data.

5. The method of claim 1, further comprising:
receiving a selection of at least four points in the video data; and
for each of the at least four points in the video data, mapping the point in the video data to a point on a rectangle within an image plane,
wherein the set of pixels is selected from a region defined by the at least four points in the video data and mapped to the rectangle within the image plane.

6. The method of claim 5, further comprising:
generating a transformation matrix based on the mappings between the at least four points in the video data and points on the rectangle within the image plane; and
applying the generated transformation matrix to frames of the video data.

7. The method of claim 1 wherein the set of pixels is a first set of pixels and wherein the method further comprises:
receiving a selection of a second set of pixels.

8. The method of claim 1 wherein the selected set of pixels is a line of pixels having a width of one pixel.

9. The method of claim 1 wherein the objects are vehicles and the video data is captured by a traffic surveillance camera.

10. The method of claim 9 wherein the selected set of pixels is associated with a lane of vehicular traffic.

11. The method of claim 10 wherein the selected set of pixels is a line of pixels at least approximately parallel to a vehicle's travel direction.

12. A computer-readable storage medium storing instructions that, if executed by a computer having a memory and a processor, cause the computer to perform operations comprising:
for a first set of pixels of the video data, capturing pixel data corresponding to the first set of pixels from each of a plurality of frames of the video data;
generating a first spatio-temporal map based on the captured pixel data corresponding to the first set of pixels;
for a second set of pixels of the video data, capturing pixel data corresponding to the second set of pixels from each of the plurality of frames of the video data, wherein the first set of pixels is different from the second set of pixels and wherein the pixel data corresponding to the first set of pixels is captured concurrently with the pixel data corresponding to the second set of pixels;
generating a second spatio-temporal map based on the captured pixel data corresponding to the second set of pixels; and
for each generated spatio-temporal map,
detecting segments of strand lines within the spatio-temporal map, each segment corresponding to a different strand line, and
grouping strand lines based at least in part on intersections between the strand lines, each group of strand lines corresponding to a different object.

13. The computer-readable storage medium of claim 12 wherein the received selection of pixels is a one-pixel wide line of pixels.

14. The computer-readable storage medium of claim 12, wherein the operations further comprise:
displaying an indication of a detected object in association with the video data.

15. The computer-readable storage medium of claim 14 wherein the displayed indication represents the position of the detected object in each of a plurality of frames of the video data.

16. The computer-readable storage medium of claim 14 wherein the displayed indication includes an indication of the speed of the detected object.

17. A system, having a memory and a processor, for detecting objects in video data, the system comprising:
a component configured to, for a selected set of pixels of the video data, generate a spatio-temporal map based on pixel data captured from chronologically-ordered frames of the video data;
a component configured to detect at least portions of strand lines within the generated spatio-temporal map;
a component configured to create a node for each of the strand lines;
a component configured to, for each strand line,
identify an intersection between the strand line and another strand line, and
create an edge between the node associated with the strand line and the node associated with the other strand line;
a component configured to identify groups of connected nodes;
a component configured to identify strands based on the identified groups of connected nodes, each strand corresponding to a plurality of strand lines; and
a component configured to detect objects based on the identified strands.

18. The system of claim 17, further comprising:
a component configured to calculate a first average strand line for a first strand based on the strand lines associated with the first strand.

19. The system of claim 17, further comprising:
a component configured to calculate the position of an object associated with the first strand in each of a plurality of frames of the video data based on the first average strand line.

20. The system of claim 17, further comprising:
a component configured to increment an object counter each time a different object is detected.

21. A computer-readable storage medium storing instructions that, if executed by a computer having a memory and a processor, cause the computer to perform operations for detecting objects within image data comprising a plurality of frames, the operations comprising:
receiving a scan line;
for each of a plurality of frames of the image data,
capturing pixel data corresponding to the scan line, and
adding the captured pixel data to a spatio-temporal map associated with the scan line;
identifying strand lines within the spatio-temporal map;

extending the identified strand lines beyond the spatio-temporal map;
creating a node for each extended strand line;
identifying intersections between the extended strand lines;
identifying groups of strand lines based on the identified intersections; and
detecting objects based on the identified groups of strand lines.

22. The computer-readable storage medium of claim 21 wherein the identifying groups of strand lines comprises:
for each extended strand line,
identifying an intersection between the extended strand line and another extended strand line, and
creating an edge between the node associated with the extended strand line and the node associated with the other extended strand line; and
identifying groups of connected nodes, each group corresponding to a different strand.

23. The computer-readable storage medium of claim 21, wherein the operations further comprise:
calculating the trajectory of a first object in the video data; and
displaying an indication of the first object in association with the video data.

24. The computer-readable storage medium of claim 21, wherein identifying an intersection for a first extended strand line comprises:
traversing the first extended strand line in one direction until an intersection with another extended strand line is detected.

* * * * *